April 29, 1930.   P. L. WHITTENBERGER   1,756,270

SPRING WHEEL

Filed May 10, 1928

Inventor

Percival L. Whittenberger

By *Clarence A. O'Brien*
Attorney

Patented Apr. 29, 1930

1,756,270

UNITED STATES PATENT OFFICE

PERCIVAL L. WHITTENBERGER, OF BISBEE, ARIZONA

SPRING WHEEL

Application filed May 10, 1928. Serial No. 276,666.

The present invention relates to improvements in spring wheels and has for its principal object to provide a structure which will eliminate the necessity of having to employ a pneumatic inner tube upon an automobile wheel.

One of the important objects of the present invention is to provide a spring wheel which will afford the proper resiliency, whereby the occupants of a vehicle equipped with this type of wheel may ride with comfort.

A further object is to provide a spring wheel of the above mentioned character which is simple in construction, inexpensive, strong and durable, and further well adapted to the purpose for which it is designed.

Other objects of the invention will become apparent as the detailed description of the invention proceeds and when taken in connection with the accompanying drawing.

In the accompanying drawing, forming a part of this application and in which like numerals designate like parts throughout the several views.

Figure 1:
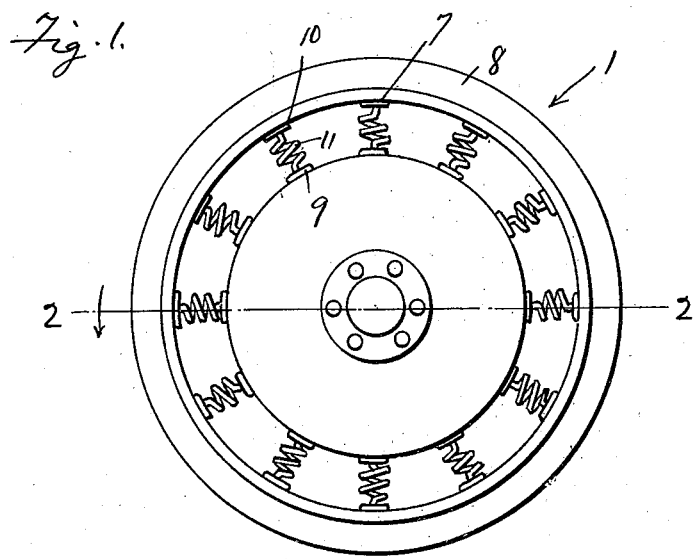
Figure 1 is a side elevation of the spring wheel embodying my invention.
Figure 2:
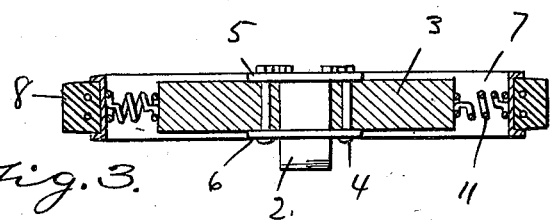
Figure 2 is a cross sectional view, taken approximately on the line 2—2 of Figure 1.

In the drawing, wherein for the purpose of illustration is shown the preferred embodiment of my invention, the numeral 1 designates generally my improved spring wheel. The wheel includes a hub 2, on which is secured the annular wooden body 3, by means of the bolts 4 that extend through the wooden body and through suitable clamping plates 5 and 6 respectively, arranged on the hub 2, on opposite sides of this wooden body.

The wheel further includes the provision of the steel rim 7, that is of a greater diameter than the annular wooden body 3, and this rim is channeled to receive and support therein the solid rubber tire, in any appropriate manner.

Figure 3:
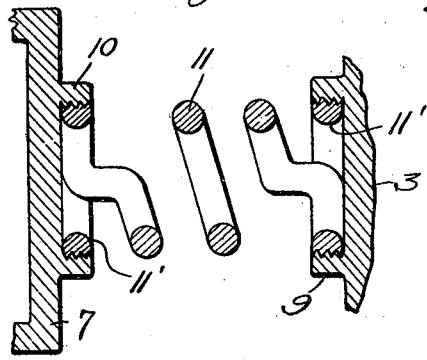
Figure 3 is an enlarged detail view in section showing the means of securing the coil spring to the rim and body of the wheel.

A series of annular spaced lugs 9 are arranged on the outer peripheral edge of the annular wooden block 3 and similar lugs 10 are arranged on the inner face of the steel rim 7. These lugs are arranged in pairs, as clearly indicated in Figure 1, for receiving the respective ends of the expansible coil spring 11. As best illustrated in Figure 3 of the drawing, the ends of each coil spring are provided with the eyes or rings 11', the outer peripheries of which are oppositely threaded and the lugs are formed with oppositely threaded openings to receive the threaded eyes of each coil spring.

In the present instance, I have shown twelve of such springs as being disposed between the annular wooden body 3 and the steel rim 7.

It is to be understood, however, that I do not wish to limit myself to the particular number of coil springs that may be used. This depends upon the tension desired and the load to be supported.

A spring wheel of the above mentioned character will, at all times, be positive and efficient in its operation and will insure comfortable riding. Furthermore, the construction of my resilient wheel is such as to tend to prevent lateral skidding.

By employing a wheel structure of the above mentioned character, the use of the usual pneumatic inner tube and tire casing is eliminated, thereby avoiding any possibility of a puncture and when the solid tire 8 has become worn the same can be removed and replaced with a new one, without necessitating the discarding of the entire wheel.

A spring wheel of the above mentioned character can be manufactured at a very low cost, and will furthermore be strong and durable.

While I have shown the preferred embodiment of my invention, it is to be understood that various changes in the size, shape and arrangement of parts may be resorted to, without departing from the spirit of the invention or the scope of the appended claim.

Having thus described my invention, what I claim as new is:

In a spring wheel including a hub having an annular body secured thereon and a tire supporting rim arranged concentrically in spaced relation to the annular body, opposed pairs of lugs arranged on the outer peripheral face of the annular body and the inner peripheral face of the rim, said pairs of lugs being formed with oppositely threaded sockets and expansible coil springs disposed radially between the body and the rim, the ends of each spring being disposed within the sockets, eyes formed integrally on the opposite ends of the springs, the outer peripheries of said eyes being threaded for threaded engagement with the sockets in a manner to detachably secure the springs therein.

In testimony whereof I affix my signature.

PERCIVAL L. WHITTENBERGER.